Feb. 21, 1928.
G. MacKAY
1,659,825
TENT ATTACHMENT FOR VEHICLES
Filed June 12, 1926     3 Sheets-Sheet 3
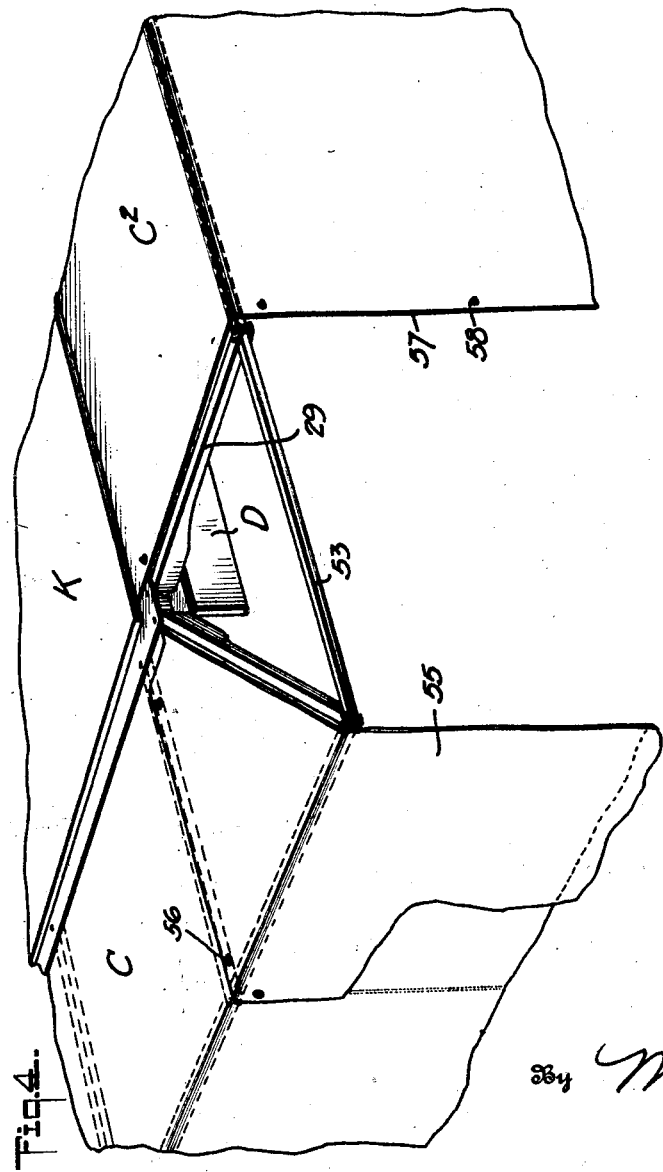
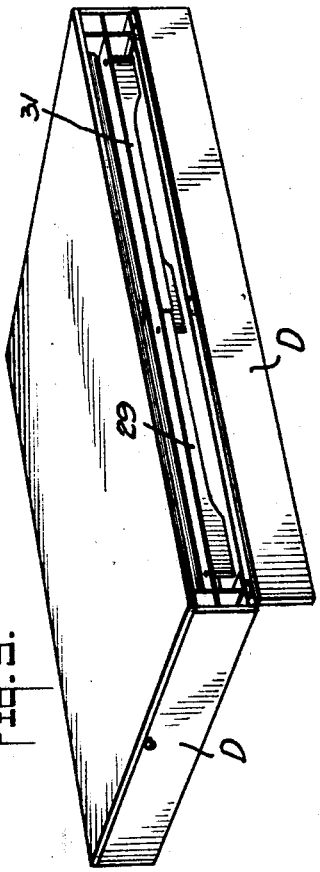
Inventor
GEORGE MacKAY
By Munn & Co.
Attorney Patented Feb. 21, 1928.

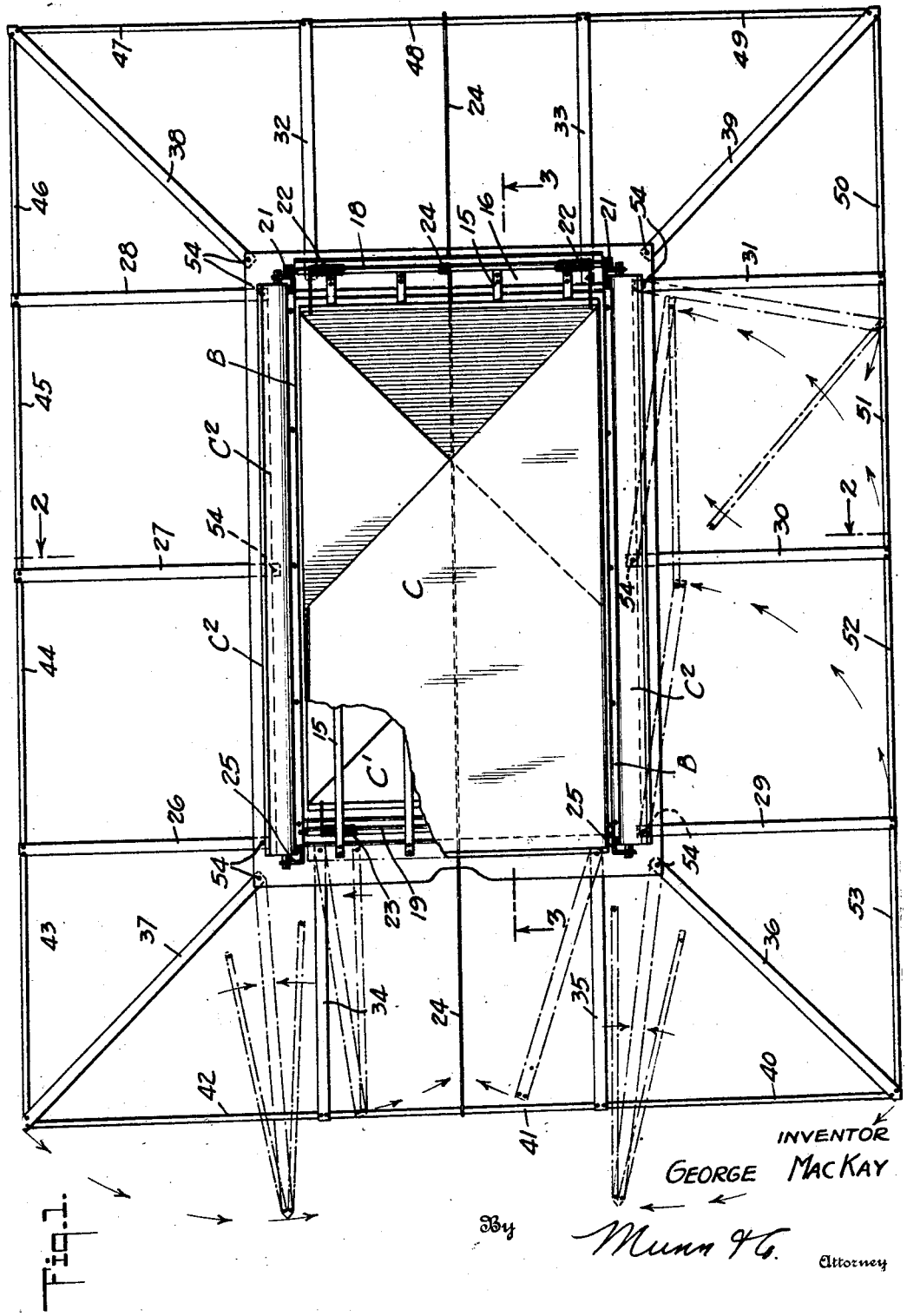

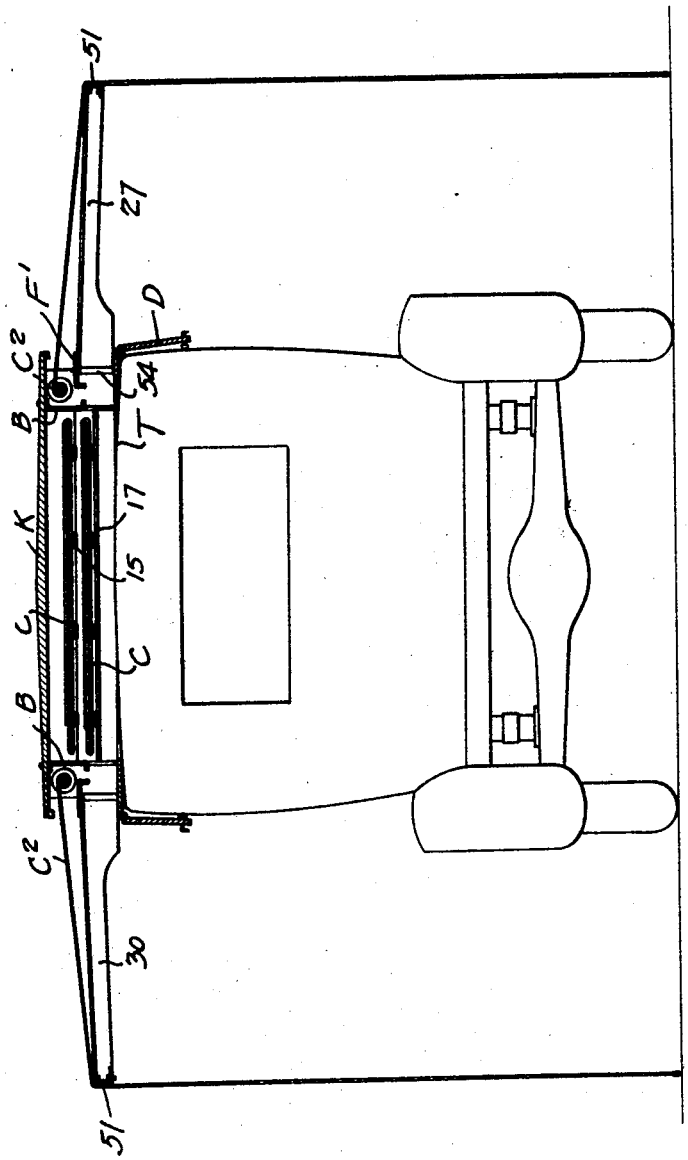

1,659,825

UNITED STATES PATENT OFFICE.

GEORGE MacKAY, OF HOLLYWOOD, CALIFORNIA.

TENT ATTACHMENT FOR VEHICLES.

Application filed June 12, 1926. Serial No. 115,574.

My invention relates to and has for its purpose the provision of a tent attachment for vehicles, particularly motor vehicles, by which a vehicle can be quickly converted into an enclosure or tent for use in camping or any other purpose requiring privacy, my invention involving the provision of a collapsible frame associated with the top of the vehicle and functioning, when in extended position, to support a plurality of curtains in extended position about the vehicle so as to coact therewith in forming a tent in which the vehicle is completely or partly closed and to provide an enclosed area about the vehicle. The curtain frame and the curtains are capable of being compactly folded and concealed within a housing provided for the purpose, secured in superimposed position on the top of the vehicle so that when the attachment is not in use it can be conveniently carried in an out of the way position and yet always accessible for immediate use.

I will describe only one form of tent attachment for vehicles embodying my invention, and will then point out the novel features thereof in claims.

In the drawings

Figure 1 is a view showing in top plan one form of tent attachment for vehicles embodying my invention, with the curtain frame in extended positions, the curtains in housed position, and the cover of the housing removed;

Figure 2 is a vertical sectional view taken on the line 2—2 of Figure 1, and showing the attachment in applied position to a motor vehicle, with the side curtains in extended position;

Figure 3 is a longitudinal sectional view taken on the line 3—3 of Figure 1;

Figure 4 is an enlarged fragmentary perspective view showing a portion of the curtain frame and two of the side and end curtains in extended position;

Figure 5 is a perspective view of the tent attachment in completely folded position, with the exception of one of the doors, which is shown in open position.

Similar reference characters refer to similar parts in each of the several views.

Referring specifically to the drawings, and particularly to Figures 2 and 3, my invention in its present embodiment comprises a base frame F of rectangular form and secured in any suitable manner to the top T of a motor vehicle. Secured to the base frame F is an upper frame F' spaced from the lower frame F and having associated therewith two side bars B, to which latter is bolted a cover K. Doors D are hinged on the bottom frame F and they co-operate with the cover K and the frames in forming a housing in which the other parts of the attachment are stored when not in use.

Normally concealed within the housing are a pair of slidable curtains C and C' formed of canvas or other suitable material and folded in position one above the other beneath the cover K, with the upper curtain C supported on strips 15 of fabric or other suitable material which extend longitudinally within the frame F and with their rear ends connected to a bar 16. The lower curtain C is supported on similar strips 17 of fabric or other suitable material, likewise extending longitudinally of the frame F' and secured thereto. The arrangement of the strips 15 and 17 is such as to provide two compartments in which the curtains C and C' are received in a manner clearly shown in Figure 3, with opposed ends of the compartments open in order to permit the withdrawal of the curtains from the housing and to the forward and rear ends thereof when the housing is in applied position upon the vehicle top. The curtains are adapted to be drawn into the compartments by the rotation of shafts 18 and 19, respectively, rotatably mounted in suitable brackets 21 (Figure 1). Cords 22 and 23, respectively, are connected to opposed ends of the curtains C and C', and these cords are trained about the respective shaft 18 or 19 so that when the shaft is rotated in the proper direction the cords will be manipulated to draw the respective curtain into its compartment. Each shaft 18 and 19 is provided with an actuating cord 24 which extends from that end of the respective compartment opposed with respect to the shaft end, and as shown in Figure 3 the cord extends beneath the respective curtain and when pulled the cord will rotate the shaft to draw the curtain into the housing. In this manner, when the curtains are properly folded they can be readily drawn into their respective compartments and thus concealed within the housing.

As shown in Figures 1 and 2, the bars B are provided with brackets 25 in which are mounted curtain rollers conventional in construction in that they are spring operated and having attached thereto curtains $C^2$.

These curtains C² will be hereinafter referred to as roller curtains to distinguish them from the slidable curtains C and C', and normally the curtains C² are rolled on the spring rollers and thus contained within the housing. The curtains, however, are accessible from the sides of the housing to be pulled outwardly to an extended position and to co-operate with the slidable curtains in forming a tent structure when employed in combination with a supporting frame.

The supporting frame in the present instance comprises a plurality of pivoted arms and rods connecting the arms to maintain the latter in fixed position with respect to each other and to thereby form a rigid frame upon which the curtains C, C' and C² are supported in extended position to form the tent. As shown in Figure 1, the frame comprises three side arms 26, 27 and 28 at one side of the housing and three arms 29, 30 and 31 at the other side of the housing, while at one end of the housing are a pair of end arms 34 and 35. Extending diagonally from the housing at the corners of the frame are arms 36, 37, 38 and 39. Connecting rods 40 to 53, inclusive, are employed to connect the side and end arms and certain of these connecting rods are detachably associated with certain of the arms in order that the frame can be collapsed and thus folded into concealed position within the housing.

In Figure 5 I have shown the supporting frame in folded position within the housing, it being understood that the arms and connecting rods are concealed upon the closing of the doors D. In Figure 1 I have shown the frame in fully extended position in which it serves to support the slidable and rolling curtains in extended position as shown in Figures 2 and 4. The arms 26, 27, etc. are pivotally supported at their inner ends between the frames F and F' by means of pins 54 as shown in Figures 1 and 2, and in such manner as to be capable of being swung from the folded position shown in Figure 5 to the extended position shown in Figure 1. When the arms are moved to the extended position as shown in Figure 1, they may be rigidly connected by means of the connecting rods 40, 41, etc., so as to form a rectangular frame upon which the curtains are supported. In describing the manner in which the frame is folded into the housing it is only necessary to describe one-half of the frame as the other half is folded in the identical manner. Referring to Figure 1, the arm 29 is first disconnected from the rod 54 and then swung inwardly to the right, maintaining its connection with the next arm 30 through the corresponding rod 53. In order to swing the arm 30 inwardly to folded position it is necessary to disconnect the rod 52 therefrom, when both of the arms 29 and 30, together with the connecting rod 50, can be folded into the housing. With the rod 52 disconnected from the arm 30, the arm 31 can be swung inwardly to folded position by disconnecting the rod 51 therefrom. To fold the arm 36, the rod 40 is disconnected from the arm 35, while the latter arm can be moved to folded position by disconnecting the rod 41 therefrom. The arm 34, when disconnected from the rod 42, can be moved to folded position together with the rod 41, and the arm 37, together with the rod 42, can be swung to folded position when the rod 43 is disconnected from the arm 26. It is only necessary to continue this operation around the entire frame in order to permit the folding of the remaining rods and arms into the sides of the housing so that when the doors D are closed they will be concealed and securely retained against accidental displacement from the housing.

In the operation of the tent attachment, the supporting frame is first moved to extended position in which it projects from the four sides of the vehicle body. The curtains C, C' and C² can now be withdrawn from the housing to extended position at the upper side of the supporting frame, and by drawing the curtains downwardly over the frame they will be supported as illustrated in Figures 2 and 4 to form an enclosure around the entire vehicle and in such spaced relation thereto as to provide an enclosed area about the vehicle. In this manner the attachment co-operates with the vehicle body in forming a tent, with the vehicle body enclosed by the curtains. After withdrawing the slidable curtains from the ends of the housing it is necessary to unfold them in order that they may extend around and span the corners of the supporting frame. In Figure 4 I have illustrated one of the slidable curtains in partly unfolded position, it being understood that to complete the unfolding operation it is necessary to unfold the outer flap indicated at 55, so that its edge carrying the fasteners 56 will be disposed in overlapped relation to the adjacent edge 57 of one roll curtain, and in a manner to permit the fastening members 56 to engage the fastening members 58 of the curtain C² to secure the two curtains to each other. Of course, when returning the curtains C and C' to the housing it is necessary to again fold the curtains in order that they may be drawn into the compartments of the housing by manipulation of the cords 24. The curtains C² can be returned to the housing through the retrieving action of the spring rollers, as will be understood.

Although I have herein shown and described only one form of tent attachment for vehicles, it is to be understood that various changes and modifications may be made therein without departing from the spirit of the invention and the spirit and scope of the appended claims.

I claim:

1. A tent attachment for vehicles, roll curtains and slidable curtains adapted to be carried on the top of the vehicle, said curtains being movable to occupy a projected position with respect to the top, and a collapsible frame on the top which when in extended position is adapted to support the roll and slidable curtains when projected in an extended position so as to provide an enclosed area about the vehicle.

2. A tent attachment for vehicles comprising a housing adapted to be secured on the top of the vehicle, curtains normally within the housing and capable of being withdrawn therefrom, and a collapsible frame normally folded in the housing and movable to an extended position in which it supports the curtains extended to provide an enclosed area about the vehicle.

3. A tent attachment for vehicles comprising a housing, roll curtains within the housing, slidable curtains within the housing, both of the curtains capable of being withdrawn from the housing, and a collapsible frame, normally folded in the housing and movable to an extended position in which it supports the curtains extended to provide an enclosed area about the vehicle.

4. A tent attachment for vehicles comprising a housing, roll curtains within the housing, slidable curtains within the housing, both of the curtains capable of being withdrawn from the housing, a collapsible frame normally folded in the housing and movable to an extended position in which it supports the curtains extended to provide an enclosed area about the vehicle, and means by which the roll curtains can be unrolled and the slidable curtains returned to concealed positions within the housing when not in use.

5. A tent attachment for vehicles as embodied in claim 3, wherein the means for returning the slidable curtains to concealed position comprises shafts, and cords trained about the shafts and connected to the slidable curtains in a manner to permit drawing of the curtains into the housing when the shafts are rotated.

6. A tent attachment for vehicles as embodied in claim 3, wherein the means for returning the slidable curtains to concealed position comprises shafts, and cords trained about the shafts and connected to the slidable curtains in a manner to permit drawing of the curtains into the housing when the shafts are rotated, and the means for returning the roll curtains to the housing comprises spring actuated rollers.

7. A tent attachment for vehicles as embodied in claim 3, wherein the means for returning the slidable curtains to concealed position comprises shafts, and cords trained about the shafts and connected to the slidable curtains in a manner to permit drawing of the curtains into the housing when the shafts are rotated, and other cords trained about the shafts and extended from the housing for rotating the shafts to draw the curtains into the housing.

8. A tent attachment as embodied in claim 3, wherein the means for returning the roll curtains to the housing comprises spring actuated rollers.

9. A tent attachment for vehicles comprising a housing having a central compartment, with its opposite ends open, and side compartments with their outer sides open, slidable curtains within the central compartment, roll curtains in the side compartments, both sets of curtains capable of being withdrawn from the compartments, and collapsible frames normally folded in the side and central compartments and movable to an extended position in which they support the curtains extended to provide an enclosed area about the vehicle.

10. A tent attachment as embodied in claim 3 wherein the frame comprises arms pivoted on the housing, and rods for rigidly connecting the arms when in extended position.

GEORGE MacKAY.